(12) United States Patent
Blythe et al.

(10) Patent No.: US 7,958,814 B2
(45) Date of Patent: Jun. 14, 2011

(54) POWER ASSEMBLY FOR INTERNAL COMBUSTION ENGINE WITH WELDED-IN PISTON SCRAPER

(75) Inventors: Neil Blythe, North East, PA (US); John P. Dowell, Grove City, PA (US); Barry Record, Grove City, PA (US); Michael Schleigh, Grove City, PA (US); Richard C. Orlando, Youngstown, OH (US); Ranga Srinivas Gunti, Bangalore (IN)

(73) Assignee: General Electic Company, Schenectady, NY (US)

( * ) Notice: Subject to any disclaimer, the term of this patent is extended or adjusted under 35 U.S.C. 154(b) by 543 days.

(21) Appl. No.: 12/055,687

(22) Filed: Mar. 26, 2008

(65) Prior Publication Data

US 2009/0241770 A1   Oct. 1, 2009

(51) Int. Cl.
*F16J 10/04*   (2006.01)
(52) U.S. Cl. ...................................................... 92/171.1
(58) Field of Classification Search ................. 92/169.1, 92/171.1
See application file for complete search history.

(56) References Cited

U.S. PATENT DOCUMENTS

| 2,108,392 | A | * | 2/1938 | Sanders | 92/169.1 |
| 3,489,130 | A | * | 1/1970 | Polidan et al. | 92/169.1 |
| 2005/0172926 | A1 | | 8/2005 | Poola et al. | |
| 2008/0150237 | A1 | | 6/2008 | Bischofberger | |

FOREIGN PATENT DOCUMENTS

| DE | 102006060330 A1 | 6/2008 |
| FR | 2028566 A | 10/1970 |
| JP | 58081347 U | 6/1983 |
| JP | 61124772 A | 6/1986 |
| JP | 01041647 A | 2/1989 |
| JP | 03180288 A | 8/1991 |

* cited by examiner

*Primary Examiner* — F. Daniel Lopez
(74) *Attorney, Agent, or Firm* — GE Global Patent Operation; John A. Kramer

(57) ABSTRACT

A power assembly for an internal combustion engine includes a piston housed within a cylinder, with the cylinder having a welded cylinder head, with the cylinder also including a one-piece piston scraper which is welded to the cylinder head, as well as to the cylinder, with a common weld bead.

18 Claims, 3 Drawing Sheets

POWER ASSEMBLY FOR INTERNAL COMBUSTION ENGINE WITH WELDED-IN PISTON SCRAPER

CROSS REFERENCE TO RELATED APPLICATIONS

None.

BACKGROUND OF THE INVENTION

Field of the Invention

This disclosure relates to a reciprocating internal combustion engine having an in-cylinder structure for removing deposits from the top land of the piston.

Internal combustion engines, particularly diesel or other compression-ignition internal combustion engines, are often operated on fuels having widely differing compositions. Unfortunately, some fuels such as marine diesel oil (MDO), or vegetable oils, or other heavy fuels, produce excessive carbon deposits which adhere to the top land of the piston. Such carbon deposits, if sufficiently thick, will rub on the bore of the cylinder, polishing the bore, and removing the cross-hatched honing marks which are necessary for the provision of adequate piston ring lubrication. If piston rings are not lubricated properly, excessive piston ring and bore wear will occur, resulting in increased blowby. And, the engine will not run properly because it will be unable to develop sufficient compression in the cylinders. This deleterious deposit buildup has been observed even with diesel engines operated on lighter distillate fuels such as diesel No. 2, and the problem has become exacerbated by the higher temperatures and pressures characterizing more modern combustion systems.

It would be desirable to provide a robust, cost-effective device for scraping carbon from the top land of pistons, particularly in the context of engines having welded cylinder heads.

BRIEF DESCRIPTION THE INVENTION

According to an aspect of the present invention, a power assembly for an internal combustion engine includes a cylinder having a circular wall defining a first inside diameter, and a piston reciprocally housed within the cylinder. A cylinder head is attached to an end of the cylinder. A one-piece piston scraper is welded to at least one of the cylinder head and the cylinder. The piston scraper defines a second inside diameter which is less than the first inside diameter.

According to another aspect of the present invention, the piston scraper is welded to both the cylinder and the cylinder head. In other words, the cylinder, the cylinder head and the piston scraper are all joined by a common weld which preferably circumscribes the periphery of the cylinder.

According to another aspect of the present invention, a piston scraper includes a cylindrical sleeve housed in a counterbore defined by the cylinder head and the cylinder, with the scraper being a close clearance fit with a top land of the piston, so that deposits will be sheared and removed from the top land of the piston when the piston moves into an upper portion of the cylinder.

According to another aspect of the present invention, a method for providing a piston deposit scraper in an upper portion of an internal combustion engine power assembly includes counterboring an upper portion of a cylinder, and counterboring a lower portion of a cylinder head, so that the counterbore formed in the cylinder head and the counterbore formed in the cylinder are contiguous once the cylinder head has been mounted to the cylinder. Then, a cylindrical sleeve is placed within the counterbored portion of either the cylinder or the cylinder head, and the cylinder head is placed in contact with the cylinder. The scraper sleeve is then welded to the cylinder and to the cylinder head. The weldment is proximate a parting line between the cylinder head and the cylinder. Once the cylinder head, piston, scraper sleeve and cylinder have been welded, an inner portion of the weld bead joining all three components may be finished, preferably by a boring operation.

It is an advantage of the system according to the present invention that an engine may be reliably operated on heavy fuels creating large amounts of deposits, but without the problem of excessive piston ring and cylinder bore wear experienced with other types of piston and cylinder combinations.

It is another advantage of a power assembly according to the present invention that the maintenance costs of such an engine will be reduced by the absence of a need to disassemble the engine to remove carbon deposits from the upper part of the engine cylinders and pistons.

It is another advantage of the present system that it may be used with engines having welded cylinder heads.

It is another advantage that the present system reduces the crevice volume within the cylinder and combustion chamber, which aids in reduction of certain exhaust emission constituents.

Other advantages, as well as features of the present invention, will become apparent to the reader of this Specification.

DETAILED DESCRIPTION OF THE PREFERRED EMBODIMENTS

Figure 1:
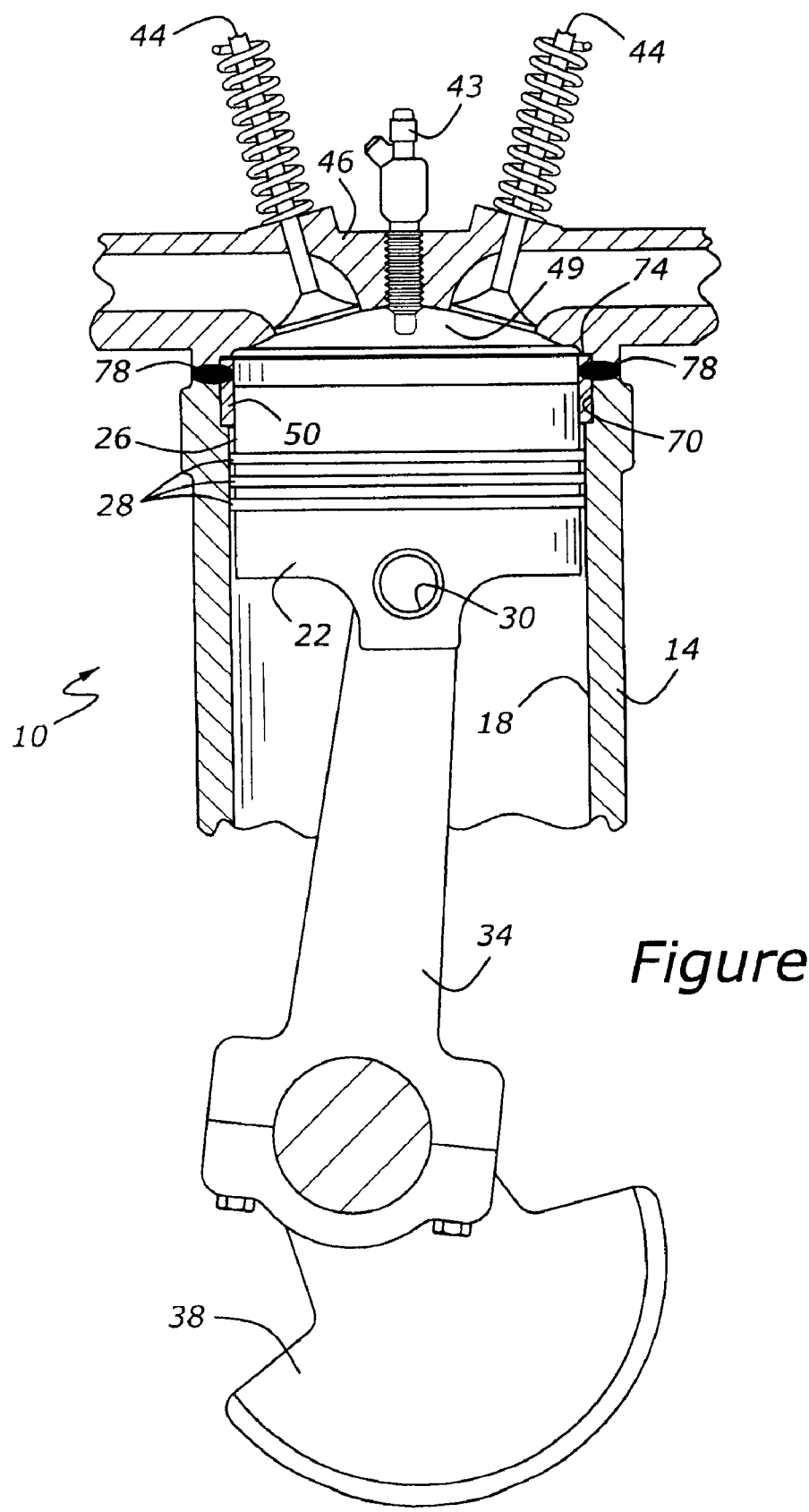
FIG. 1 is a sectional view of an engine having a piston deposit scraper according to an aspect of the present invention.

As shown in FIG. 1, engine 10 has a cylinder, 14, with a circular wall, 18. A piston, 22, is housed reciprocally within cylinder 14. Piston 22 has a top land, 26. A number of piston rings, 28, are located below top land 26.

Piston 22 is attached to a crankshaft, 38, by means of a connecting rod, 34, and a wrist pin, 30. Conventional poppet valves, 44, handle the ingress and egress of air and exhaust gases, respectively, from engine cylinder 14. A fuel injector, 43, sprays into a combustion chamber, 49. Those skilled in the art will appreciate, in view of this disclosure, that the particular type of valving arrangements and the use of injectors, whether in-cylinder, or in-port, are matters not committed to the current invention. Similarly, the present invention could be employed not only with the illustrated compression ignition engine, but also spark-ignited internal combustion engines.

FIG. 1 also shows a cylinder head, 46, and a one-piece, gapless piston scraper, 50, housed in a counterbore defined by individual counterbores formed in cylinder head 46 and cylinder 14. Piston scraper 50 may also be termed an anti-polishing ring, a carbon scraper, a carbon scraper ring, a carbon cutting ring, a flame ring, a fire ring, or a scraper ring.

In any event, ring 50 is said to be "gapless" because ring 50 is configured as a continuous hoop without the discontinuous gap usually found with engine power assembly rings such as piston rings.

Figure 2:
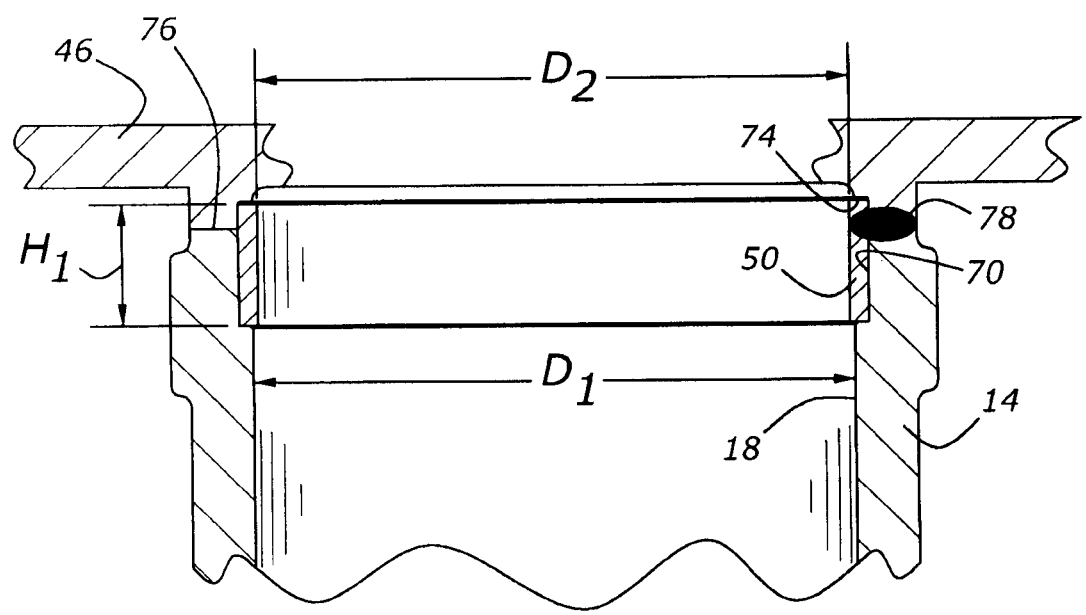
FIG. 2 shows a sectional view, partially in elevation, of an engine cylinder with a piston deposit scraper according an aspect of the present invention.

FIG. 2 illustrates further details about piston scraper 50, which is configured as a cylindrical sleeve housed in a counterbore defined by cylinder head 46 and cylinder 14. Thus, it is seen that cylinder 14 has a counterbore, 70, whereas cylinder head 46 has a counterbore, 74. Piston scraper 50 is caged within the counterbore defined by individual counterbores 70 and 74. Parting line 76 of FIG. 2 generally defines the unwelded region in which cylinder head 46, cylinder 14, and piston scraper 50 will be joined into a single assembly. Parting line 76 is thus seen as demarcating a lower portion of cylinder head 46, as well as an upper portion of cylinder 14. As an alternative, scraper ring 50 could be housed in a single counterbore, 70, formed in cylinder 14.

FIG. 2 also shows weld bead 78, which joins not only cylinder head 46 and cylinder 14, but also piston scraper 50. Once weld bead 78 has been formed about the entire periphery of cylinder 14 and scraper 50, and cylinder head 46, scraper 50 will positively be retained not only by the counterbores formed in cylinder head 46 and cylinder 14, but also by weld 78 itself. This assures that scraper 50 will not fret, or shift, within cylinder 14. Note from FIG. 2 that weld 78 preferably penetrates the entirely of cylinder head 46, cylinder 14, and scraper 50. Those skilled in the art will appreciate in view of this disclosure that more than one type of welding process could be employed for placing weld 78. These include electron beam welding, gas metal arc welding, gas tungsten arc welding, and yet other processes.

Diameter D(1) of cylinder 14 (FIG. 2) is sized to accept the portion of piston 22 below top land 26. Diameter D(2) is smaller than diameter D(1) and is sized to be a close clearance fit to top land 26. Because piston scraper 50 is a close clearance fit upon top land 26, scraper 50 will cause deposits to be sheared and physically removed from top, or upper land, 26 when piston 22 moves into the top dead center, or upper, portion of cylinder 14. This upper portion of cylinder 14 extends above the so-called ring reversal portion of cylinder 14 upon which piston rings 28 slide.

Piston scraper 50 has an installed height H(1) (FIG. 2) which approximates the height of top land 26. In this manner piston scraper 50 will scour deposits off the entirety of top land 26 as piston 22 reciprocates within cylinder 14.

Figure 3:
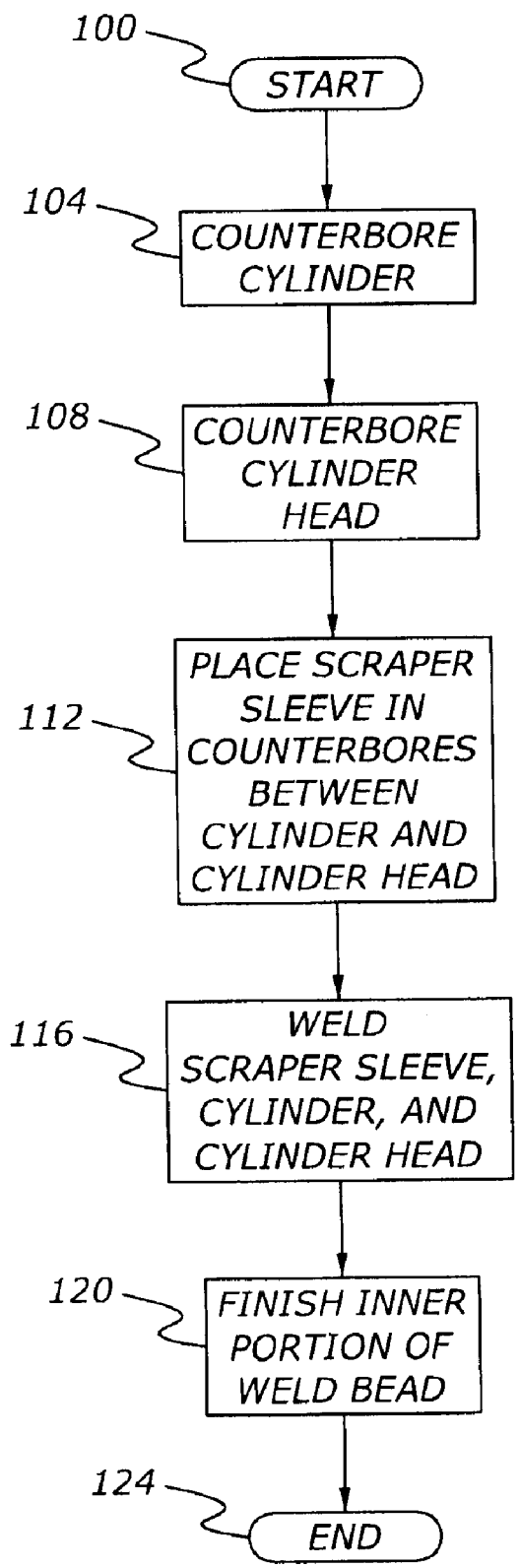
FIG. 3 is a flow diagram illustrating a method according to an aspect of the present invention.

In the illustrated embodiment, piston scraper 50 is installed within an engine according to the method shown in FIG. 3. Beginning at block 100 with a start command, cylinder 14 is counterbored at block 104, to configure counterbore 70. Then, at block 108, counterbore 74 is formed in cylinder head 46. At block 112, scraper sleeve 50 is installed in counterbores 70 and 74 and then, at block 116, weld 78 is applied about the entirety of the parting line 76 between cylinder head 46 and cylinder 14. Note once again, from FIG. 2, that weld bead 78 is a common weld subscribing the periphery of cylinder 14 and joining all three of cylinder head 46, cylinder 14, and scraper ring 50 together.

Once the welding operation has been concluded at block 116, the method continues at block 120 with the finishing of an inner portion of weld bead 78. This may be done by boring the cylinder followed by a honing operation. Those skilled in the art will appreciate in view of this disclosure, however, that there are many ways for finishing the inner surface 18 of cylinder 14 as well as the adjoining surfaces of cylinder head 46 and scraper sleeve 50. Indeed, the process step at block 120 is optional to the extent that certain welding processes may not cause disruption of the inner surface of scraper sleeve sufficient to demand a post-welding operation. At any rate, once the finishing, if any, is concluded, the method stops at block 124.

The foregoing invention has been described in accordance with the relevant legal standards, thus the description is exemplary rather than limiting in nature. Variations and modifications to the disclosed embodiment may become apparent to those skilled in the art and fall within the scope of the invention. Accordingly the scope of legal protection afforded this invention can only be determined by studying the following claims.

What is claimed is:

1. A power assembly for an internal combustion engine, comprising:
   a cylinder having an inner circular wall defining a first inside diameter;
   a piston reciprocally housed within the cylinder;
   a cylinder head attached to an end of the cylinder; and
   a one-piece piston scraper welded to both of said cylinder head and said cylinder, with said piston scraper defining a second inside diameter which is less than said first inside diameter.

2. A power assembly according to claim 1, wherein said piston scraper, said cylinder, and said cylinder head are all joined by a common weld circumscribing the periphery of the cylinder.

3. A power assembly according to claim 1, wherein said piston scraper, said cylinder, and said cylinder head are all joined by a common weld circumscribing the periphery of the cylinder at a location proximate a parting line between the cylinder and the cylinder head.

4. A power assembly according to claim 2, wherein said weld encompasses a portion of said inner circular wall of said cylinder.

5. A power assembly according to claim 1, wherein said piston scraper comprises a cylindrical sleeve housed in a counterbore defined by the cylinder head and the cylinder, whereby deposits will be removed by shearing action from the top land of the piston when the piston moves to an upper portion of the cylinder.

6. A power assembly according to claim 5, wherein said piston scraper is mounted at a location proximate an upper portion of the cylinder.

7. A power assembly according to claim 5, wherein said piston scraper is mounted at a location above the ring reversal region of the cylinder.

8. A power assembly according to claim 1, wherein said piston scraper comprises a cylindrical sleeve housed in a counterbore defined by the cylinder head and the cylinder.

9. A power assembly according to claim 8, wherein said cylindrical sleeve is gapless.

10. A power assembly according to claim 1, wherein said piston scraper comprises a cylindrical sleeve housed in a counterbore defined by the cylinder.

11. A method for providing a piston deposit scraper at an upper portion of an internal combustion engine power assembly, comprising:
    counterboring an upper portion of a cylinder;
    counterboring a lower portion of a cylinder head, whereby the counterbore formed in the cylinder head and the counterbore formed in the cylinder are contiguous;
    placing a cylindrical scraper sleeve in the counterbored portions of said cylinder and said cylinder head;
    placing said cylinder head in contact with said cylinder; and
    welding said scraper sleeve to said cylinder and to said cylinder head.

12. A method according to claim 11, wherein the scraper sleeve is welded to the cylinder head and the cylinder at a location proximate a parting line between the cylinder head and the cylinder.

13. A method according to claim 11, further comprising finishing an inner portion of a weld bead joining the scraper sleeve to the cylinder head and the cylinder.

14. A power assembly for an internal combustion engine, comprising:
- a cylinder having an inner circular wall defining a first inside diameter;
- a piston reciprocally housed within the cylinder, with said piston having a top land;
- a cylinder head attached to an end of the cylinder;
- a one-piece, cylindrical scraper sleeve mounted within a counterbore defined by separate counterbores formed in the cylinder and cylinder head; and
- a common weld bead circumscribing the periphery of the cylinder, with said weld bead joining said scraper sleeve to both said cylinder head and said cylinder.

15. A power assembly according to claim 14, wherein said scraper sleeve defines a second inside diameter which is slightly larger than the outside diameter of said top land of said piston.

16. A power assembly according to claim 14, wherein said scraper sleeve defines a second inside diameter which is sized to be a close clearance fit with said top land of said piston, whereby combustion deposits will be sheared from the surface of said top land.

17. A power assembly according to claim 14, wherein said common weld bead is continuous.

18. A power assembly according to claim 14, wherein said scraper sleeve is gapless.

* * * * *